United States Patent [19]
Sprecher

[11] 3,851,836
[45] Dec. 3, 1974

[54] VEHICLE OCCUPANT RESTRAINT BELT RETRACTOR

[75] Inventor: Raymond G. Sprecher, Detroit, Mich.

[73] Assignee: General Motors Corporation, Detroit, Mich.

[22] Filed: Aug. 23, 1973

[21] Appl. No.: 390,783

[52] U.S. Cl. ....... 242/107.7, 242/107.6, 242/107 SB
[51] Int. Cl. ........................................... B65h 75/48
[58] Field of Search ................... 242/107; 297/388; 280/150 SB; 74/576, 577 R, 577 S, 577 SF; 188/82.7, 82.4

[56] References Cited
UNITED STATES PATENTS
| | | | |
|---|---|---|---|
| 887,689 | 5/1908 | Olop | 242/107.6 |
| 1,082,842 | 12/1913 | Beckwith et al. | 74/576 |
| 3,206,137 | 9/1965 | Snyderman | 242/107.7 |

FOREIGN PATENTS OR APPLICATIONS
| | | | |
|---|---|---|---|
| 986,867 | 8/1951 | France | 242/107.7 |

*Primary Examiner*—Donald E. Watkins
*Assistant Examiner*—Edward J. McCarthy
*Attorney, Agent, or Firm*—J. A. Kushman

[57] ABSTRACT

A vehicle occupant restraint belt retractor with a winding prevention mechanism including a control disk frictionally clutched to the retractor belt reel and operable to block or allow engagement between a leaf spring and the reel in a manner that selectively holds the reel against belt winding rotation under its normally winding bias so that the belt is selectively held unwound for use. The leaf spring is engageable with exposed radial projections on the reel located between circumferentially spaced outer arcuate surfaces of the disk to hold selected lengths of belt unwound and is blocked from engagement with other radial projections by these arcuate surfaces when the belt is unwound to lengths between the selected ones. This blocking allows the reel to commence belt winding rotation so that the spring slides along and engages a catch surface on the arcuate surface providing the blocking, and the spring then holds the disk against rotation as the blocking allows the reel to rotate in a belt winding direction and to fully store the belt. This belt winding can be allowed to a limited degree so that a limited rotation of the disk with respect to the belt reel allows the leaf spring engagement with the reel at the radial projections on the reel that were previously blocked in a manner that adjusts the lengths of belt that can be held unwound for use.

3 Claims, 4 Drawing Figures

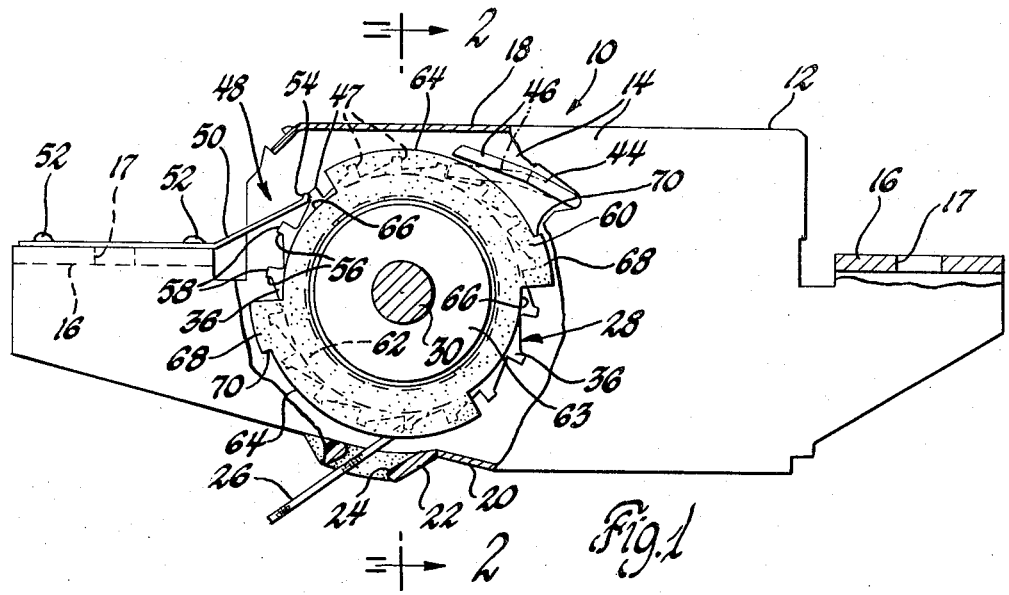
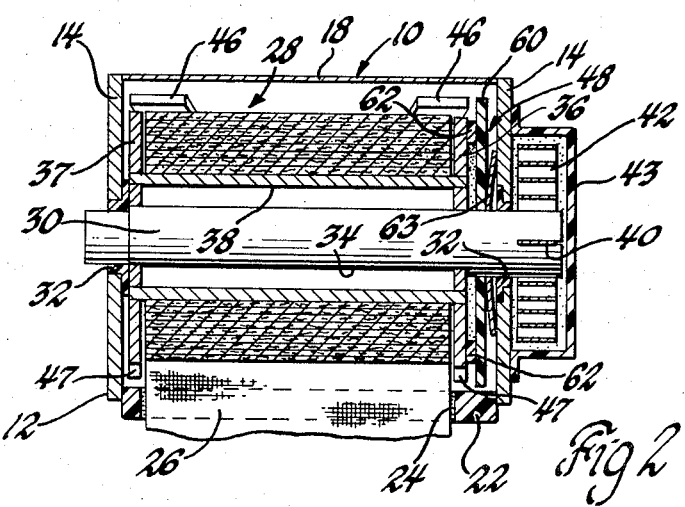
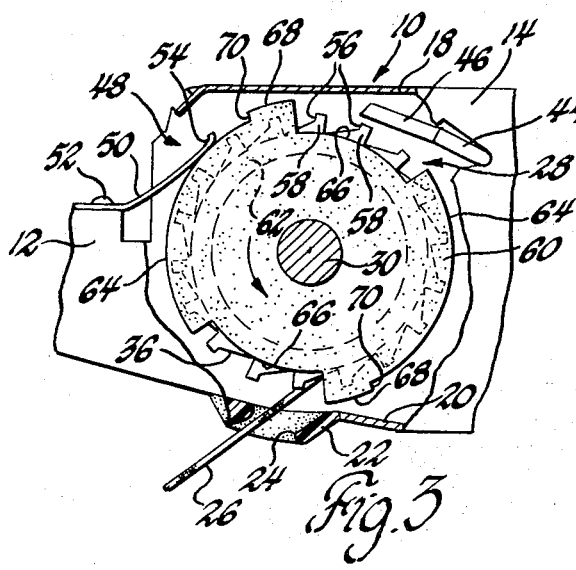
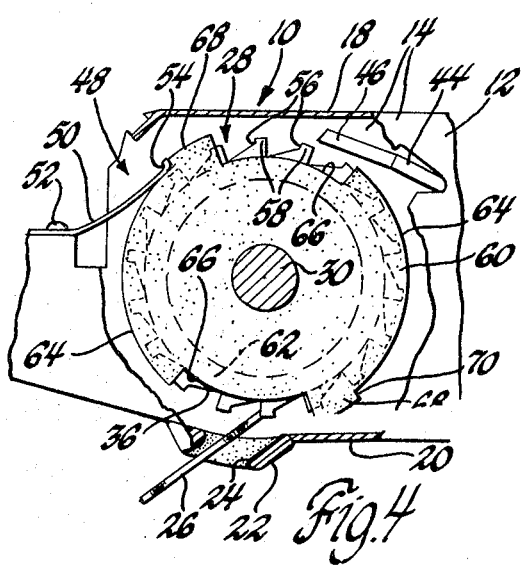

3,851,836

VEHICLE OCCUPANT RESTRAINT BELT RETRACTOR

This invention relates generally to inertia locking vehicle occupant restraint belt retractors of the type wherein the retractor belt reel is spring biased in a belt winding direction and selectively held against this bias to hold the restraint belt in an unwound condition for use.

Restraint belt retractors of the above-described type for the most part in the past have utilized manually operated releases requiring deliberate occupant effort independent of the restraint belt in order to release the retractor belt reel for belt winding rotation in a manner that stores the belt on the reel. This type of retractor has also been known to include one or more pawls pivotally mounted on the sun gear of a planetary gearing arrangement whose ring gear is rotatable with the reel. The pawl is thrown outwardly by centrifugal force when the belt is allowed to be freely wound under the belt reel bias so as not to be engageable with a disk mounted on the retractor housing. When the belt is manually held and allowed to be wound more slowly under the reel bias, gravity moves the pawl inwardly into engagement with a notch on the upper side of the housing mounted disk and thereby holds the reel against further belt winding rotation under the belt winding reel bias.

SUMMARY OF THE INVENTION

The vehicle occupant restraint belt retractor of this invention has a winding prevention mechanism including a control disk frictionally clutched to the retractor belt reel and operable to block or allow engagement between a detent member and the reel in a manner that selectively holds the reel against belt winding rotation under its normal winding bias so that the belt is selectively held unwound for use.

One feature of this invention is that the disk has a circumferential surface that blocks engagement of the detent member with a circumferential portion of the reel to allow belt winding reel rotation, and this disk surface catches the detent member as the belt winding proceeds to hold the disk against rotation in a manner which, when performed to a limited extent, exposes the circumferential portion of the reel previously blocked so that the detent member is engageable therewith to adjust the lengths of belt that may be held unwound for use. Another feature of the invention is that the detent member takes the form of an elongated leaf spring with one end fixedly mounted on the retractor housing and with the other free end thereof normally biased toward the reel, and the circumferential surface on the disk has an arcuate configuration and is located at the outer periphery of the disk with the catching of the leaf spring during the belt winding reel rotation being performed by a catch surface that extends radially outward at the end of this surface in the belt unwinding direction of reel rotation. Another feature of the invention is that the control disk may include a plurality of the outer arcuate surfaces that provide the blocking and these surfaces are spaced in a circumferential relationship with respect to each other so as to expose circumferentially spaced portions of the reel which the leaf spring engages to provide the belt winding prevention, and the limited belt winding reel rotation changes the circumferential portions of the reel which are selectively blocked from engagement with or engaged by the leaf spring in the manner which allows adjustment of the length of the belt that is selectively held unwound for use.

BRIEF DESCRIPTION OF THE DRAWINGS

The above-specified features and other features, objects and advantages of the present invention are readily apparent from the following detailed description of the preferred embodiment and the drawings in which:

FIG. 1 is a partially broken away side elevation view of a vehicle occupant restraint belt retractor which includes a winding prevention mechanism shown in a condition preventing belt winding reel rotation so as to hold the associated restraint belt in an unwound condition for use;

FIG. 2 is a sectional view of the retractor taken along line 2—2 of FIG. 1 and illustrates the manner in which a washer spring biases a control disk of the winding prevention mechanism into frictional engagement with the retractor belt reel so as to be frictionally clutched to the reel;

FIG. 3 is a view of a portion of FIG. 1 showing the control disk blocking engagement between the retractor belt reel and a leaf spring of the winding prevention mechanism so as to allow belt winding rotation; and FIG. 4 is a view similar to FIG. 3 in which the retractor belt reel has rotated in the belt winding direction from the FIG. 3 position and shows engagement between the leaf spring and the end of the disk surface that blocks the engagement thereof with the belt reel so as to rotate the control disk with respect to the reel in a manner which, when done to a limited extent, allows a change in the circumferential portions of the belt reel which the spring engages so as to allow adjustment of the length of belt that is selectively held in an unwound condition for use.

DETAILED DESCRIPTION OF THE PREFERRED EMBODIMENT

Referring to FIG. 1 of the drawings, a vehicle occupant restraint belt retractor indicated generally by 10 includes a housing 12 having side walls 14 that are spaced in opposed parallel relationship with respect to each other. The ends of each housing side wall 14 are connected to the ends of the other side wall by mounting flanges 16 that include suitable apertures 17 for receiving mounting bolts that are adaptable to secure the retractor to a vehicle, such as to the vehicle outer roof edge so that the retractor functions as a shoulder belt retractor. The upper side of the retractor is closed by a suitable cover 18 and the lower side of the retractor is closed by a suitable cover 20 that carries a plastic belt guide 22. An aperture 24 in the belt guide allows an occupant restraint belt 26 to extend downwardly out of the retractor 10 for use in belting a seated vehicle occupant in position.

Additional reference to FIG. 2 shows that the restraint belt 26 is wound on a belt reel 28 located above the belt guide 22 between the housing side walls 14. A central shaft 30 of reel 28 is rotatably supported by annular bushings 32 mounted on the housing side walls 14. An elongated flat 34 of shaft 30 keys a pair of end plates 36 and 37 thereto for rotational movement with the shaft about its elongated axis. A drum 38 extends between these end plates and attaches the inner end of belt 26 so that the belt is wound on and unwound from the drum as the reel 28 rotates. The FIG. 2 right-hand end of shaft 30 extends outwardly of the adjacent housing side wall 14 and is slotted to receive the inner end 40 of a spiral or clock spring 42. A plastic cover 43 covers the spring and the slotted shaft end to give the retractor an aesthetically appealing appearance. Spring 42 has an outer end, not shown, that is secured to the adjacent side wall 14 so as to provide a spring bias that normally rotates belt reel 28 in a belt winding direction, counterclockwise as viewed in FIG. 1. Belt 26 may be pulled from the retractor 10 for use and then rotates the belt reel 28 in a belt unwinding direction against the bias of this spring 42, this direction being clockwise as viewed in FIG. 1.

Adjacent the right-hand upper side of belt reel 28 as seen in FIG. 1, a locking member 44 is suitably mounted between the housing side walls 14 for movement between the solid line indicated unlocked position and the phantom line indicated locked position. Locking projections 46 of the locking member are engageable with circumferentially spaced locking surfaces 47 on the end plates 36 and 37 of belt reel 28 while the locking member is in locked position and thereby prevent rotational movement of belt reel 28 in the belt unwinding direction so that a belted occupant is thus restrained against movement. Locking member 44 is moved to this locked position by a suitable inertia member that is responsive to an abrupt change in the rate of vehicle movement. This inertia member may be of a pendulum type such as shown in the application of Dully, et al., Ser. No. 348,963, filed on Apr. 9, 1973 as a continuation-in-part of Ser. No. 328,877 which was filed on Feb. 1, 1973 and is now abandoned, both of these applications being assigned to the assignee of the present invention and being hereby incorporated by reference. It is also possible for the retractor of this invention to utilize an inertia locking mechanism responsive to belt reel rotation to provide reel locking against belt unwinding rotation upon an abrupt jerk of belt 26 from retractor 10. This latter type of locking mechanism is well known and is, therefore, not being described in detail.

A winding prevention arrangement according to this invention is generally indicated in the drawings by 48 and is operable in response to selective winding and unwinding of belt 26 to hold the belt reel 28 against belt winding rotation under the bias of spring 42 so that the belt 26 is not tensioned and can belt an occupant in a slackened manner. When the retractor 10 is used as a shoulder belt, the belt 26 can thus allow a certain degree of slack that affords limited occupant upper torso movement while still being held against excessive forward movement during vehicle impact conditions by one of the belt unwinding types of locking actuation described above. A detent member of the mechanism takes the form of an elongated leaf spring 50 and has one end fixedly mounted on the left-hand mounting flange 16 of the retractor housing by rivets 52 so that the free end 54 of the spring is normally biased toward the reel end plate 36 adjacent the FIG. 2 right-hand side wall 14. This free spring end is selectively engageable with one of a number of circumferentially spaced surfaces 56 on radial projections 58 of the end plate, the opposite sides of these projections defining the locking surfaces 47 that are engaged by locking member 46 to prevent belt unwinding.

The winding prevention mechanism 48 also includes a control disk 60 that is positioned between the reel end plate 36 and the adjacent housing side wall 14. This disk is rotatable about the central shaft 30 of reel 28 and, as seen in FIG. 2, carries an annular friction member 62 that engages the reel end plate 36. A washer spring 63 also encircles the reel shaft 34 and extends between the housing side wall 14 and the right-hand side of control disk 60 so as to bias the friction member 62 into frictional engagement with the end plate 36 in a manner that normally rotates the control disk with belt reel 28 but allows relative rotation therebetween in a frictionally clutched manner. The outer periphery of control disk 60 includes a pair of circumferentially spaced arcuate surfaces 64 located radially outward of the projections 58 on reel end plate 36. These arcuate surfaces extend about the axis of reel rotation for approximately 120° and are selectively operable to block engagement of the free spring end 54 with the surfaces 56 on the end plate. Between the arcuate surfaces 64, the outer periphery of control disk 60 defines arcuate notches 66 that expose the reel surfaces 56 to allow engagement of spring 54 with these surfaces so as to prevent the belt winding reel rotation. The clockwise ends of the arcuate surfaces 64 define radial projections 68 on the disk adjacent the counterclockwise ends of arcuate notches 66. These radial projections include catch surfaces 70 that face in the belt winding direction of reel rotation and are engageable with the free spring end 54, as shown in FIG. 4, to hold the control disk 60 against movement with the belt reel as the restraint belt 26 is wound on the reel with the spring blocked out of engagement with reel surfaces 56. It should be noted that the control disk 60 is laterally spaced from locking member 44 and at no time interferes with movement of this member to locked position so as to prevent belt unwinding reel movement.

A vehicle occupant desiring to utilize belt 26 when the belt is stored on the belt reel in a fully wound condition will pull the belt 26 outwardly of the retractor 10 against the bias of spring 42 so that belt reel end plate 36 and control disk 60 rotate clockwise. As this rotation occurs, the free spring end 54 will ratchet over the radial projections 58 exposed by the control disk notches 66, over the radial projections 68 of the arcuate surfaces 64, and also over these arcuate surfaces until a sufficient amount of belt has been unwound for attaching the belt in use position. This belt unwinding, in order to provide sufficient belt length for attachment, will be slightly greater than the belt length required to snugly belt the occupant. At this stage, the free spring end 54 may be engaged with one of the arcuate surfaces 64, with the outer surface of one of the radial projections 68, or with one of the reel surfaces 56 exposed by the arcuate notches 66 in the control disk 60.

If the spring end 54 engages one of the arcuate surfaces 64 of the disk after belt attachment in use position, the belt reel is then allowed to wind the belt to a snug condition across the occupant as the leaf spring end 54 slides into engagement with the catch surface 70 of the arcuate surface, in the manner shown by FIG. 4, and holds disk 60 against rotation. The occupant may then pull the belt outwardly slightly further so that reel rotation causes the spring end 54 to be received by the next adjacent counterclockwise notch 66 in the control disk and to thereby engage one of the surfaces 56 on the reel to prevent the belt winding reel movement. This additional belt pull out will thus leave the belt in a slightly slackened condition as it restrains the occupant. This degree of belt slackness may be varied by limiting the winding reel movement toward the snug condition across the occupant or by the occupant pushing himself into the seat more than normal so that the belt is wound slightly more than when in its normal snug condition. This varies the relative rotation between the reel end plate 36 and the control disk 60 while the spring 50 holds the disk stationary as the reel winds the belt, and thereby varies the reel surfaces 56 that are exposed for engagement by spring 50 in a manner that provides adjustment of the belt length that is held unwound for use. The lesser amount of belt winding, of course, causes a great amount of belt to be held unwound while the greater amount of belt winding causes a lesser amount of belt to be held unwound.

If the leaf spring end 54 is engaged with the outer surface of one of the radial projections 68 on control disk 60 after belt attachment in use position, the belt reel winding bias will then cause the reel to move in a counterclockwise belt winding direction and engage the spring end with one of the reel surfaces 56 exposed within the disk notch 66 located immediately clockwise of this particular radial projection 68. The retractor is then in the same condition as when attachment of the belt in use position leaves the spring engaged witn one of the exposed reel surfaces 56. If the amount of belt unwound corresponds with the desired amount under either of these conditions, the occupant need do nothing more. If adjustment of this belt length is necessary, the occupant pulls the belt out slightly until the spring 50 ratchets over the first radial projection 68 and then allows belt winding so that spring end 54 engages the associated catch surface 70. The adjustment of the length of belt held unwound for use is then performed in the manner discussed above.

It is thus believed evident from the foregoing that this vehicle occupant restraint belt retractor includes a new and improved belt winding prevention mechanism that is controlled by belt movement independent of any other deliberate occupant effort.

What is claimed is:

1. In a vehicle occupant restraint belt retractor including a housing adapted to be mounted on a vehicle, a belt reel rotatably supported on the housing for movement in belt winding and unwinding directions so as to wind and unwind an associated restraint belt, spring means normally biasing the belt reel in the belt winding direction of rotation, and an inertia locking mechanism for selectively locking the belt reel against movement in the belt unwinding direction of rotation, a mechanism for selectively preventing the spring means from rotating the belt reel in the belt winding direction so as to hold the belt in an unwound condition for use, the mechanism comprising:

a plurality of circumferentially spaced surfaces on the belt reel facing in the belt winding direction of rotation;

a detent member mounted on the housing and movable between locked and unlocked positions with respect to the surfaces on the belt reel to prevent the spring means from rotating the belt reel in the belt winding direction while in locked position and to allow such rotation while in unlocked position;

means for biasing the detent member to locked position; and a control disk frictionally driven with the belt reel and rotatable with respect thereto about the axis of reel rotation, the control disk including an engagement surface extending circumferentially about the axis of reel rotation for an angle less than 360° so as to engage the detent member and block engagement thereof with a number of the adjacent surfaces on the belt reel, the disk defining a notch receiving the detent member to allow engagement of the detent member and any one of the other surfaces on the reel so as to prevent the belt winding reel rotation, the detent member being alternately engaged with the engagement surface of the disk or received within the notch as the disk rotates with the reel during belt unwinding reel rotation, the end of the engagement surface located in the belt unwinding direction of rotation having a catch surface that engages the detent member and holds the disk against rotation with the reel while holding the detent member out of engagement with the reel as the spring means rotates the reel in the belt winding direction after proceeding from a condition where the detent member is engaged with the engagement surface, and this engagement between the detent member and the catch surface rotating the disk to a limited extent with respect to the reel when the reel is rotated to a limited extent in the belt winding direction such that this relative rotation changes the rotational position of the disk with respect to the reel so as to change surfaces on the reel which the detent member is engageable with or is blocked from engagement with in a manner that allows selective control of the rotational positions at which the detent member holds the belt reel against the winding bias of the spring means so as to thereby allow adjustment of the length of the belt that is held unwound for use.

2. In a vehicle body restraint belt retractor including a housing adapted to be mounted on a vehicle body, a belt reel rotatably supported on the housing for movement in belt winding and unwinding directions so as to wind and unwind an associated restraint belt, spring means normally biasing the belt reel in the belt winding direction of rotation, and an inertia locking mechanism for selectively locking the belt reel against movement in the belt unwinding direction of rotation, a mechanism for selectively preventing the spring means from rotating the belt reel in the belt winding direction so as to hold the belt in an unwound condition for use, the mechanism comprising:

a plurality of circumferentially spaced surfaces on one end of the belt reel, these surfaces facing in the belt winding direction of reel rotation;

an elongated leaf spring with one end fixedly mounted on the housing and with the other free end thereof biased toward engagement with the reel so as to engage a selected one of the surfaces on the reel and thereby prevent the spring means from rotating the belt reel in the belt winding direction; and a control disk frictionally driven with the belt reel and rotatable with respect thereto about the axis of reel rotation, the control disk including an outer arcuate surface extending circumferentially about the axis of reel rotation for an angle of less than 360° so as to engage the leaf spring and block engagement thereof with a number of the adjacent surfaces on the belt reel, the disk defining a notch receiving the leaf spring and thereby allowing engagement of the leaf spring and any one of the other surfaces on the reel so as to prevent the belt winding reel rotation, the leaf spring being alternately engaged with the arcuate surface of the disk or received within the notch as the disk rotates with the reel during belt unwinding reel rotation, the end of the arcuate surface located in the belt unwinding direction of rotation having an outwardly extending catch surface that engages the leaf spring and holds the disk against rotation with the reel while holding the leaf spring out of engagement with the reel as the spring means rotates the reel in the belt winding direction after proceeding from a condition where the leaf spring is engaged with the arcuate surface, and this engagement between the leaf spring and catch surface rotating the disk to a limited extent with respect to the reel when the reel is rotated to a limited extent in the belt winding direction such that this relative rotation changes the surfaces on the reel which the leaf spring is engageable with or is blocked from engagement with in a manner that allows selective control of the rotational positions at which the leaf spring holds the belt reel against the winding bias of the spring means so as to thereby allow adjustment of the length of the belt that is held unwound for use.

3. In a vehicle body restraint belt retractor including a housing adapted to be mounted on a vehicle body, a belt reel rotatably supported on the housing for movement in belt winding and unwinding directions so as to wind and unwind an associated restraint belt, spring means normally biasing the belt reel in the belt winding direction of rotation, and an inertia locking mechanism for selectively locking the belt reel against movement in the belt unwinding direction of rotation, a mechanism for selectively preventing the spring means from rotating the belt reel in the belt winding direction so as to hold the belt in an unwound condition for use, the mechanism comprising:

a plurality of circumferentially spaced surfaces on one end of the belt reel, these surfaces extending generally radially outwardly with respect to the axis of reel rotation and facing in the belt winding direction of reel rotation;

an elongated leaf spring with one end fixedly mounted on the housing and with the other free end thereof normally biased into engagement with the reel so as to engage a selected one of the surfaces on the reel and thereby prevent the spring means from rotating the belt reel in the belt winding direction; and a control disk frictionally driven with the belt reel and rotatable with respect thereto about the axis of reel rotation, the control disk including a plurality of circumferentially spaced outer arcuate surfaces extending circumferentially about the axis of reel rotation for angles of less than 180° so as to engage the leaf spring and block engagement thereof with a number of the circumferentially spaced adjacent sets of the surfaces on the belt reel, the disk allowing engagement of the leaf spring and any one of the surfaces on the reel located between these arcuate surfaces of the disk so as to prevent the belt winding reel rotation, the ends of the arcuate surfaces located in the belt unwinding direction of rotation having respective outwardly extending catch surfaces, a selected one of the catch surfaces being engaged by the leaf spring to hold the disk against rotation to the reel while holding the leaf spring out of engagement with the reel as the spring means rotates the reel in the belt winding direction after proceeding from a condition where the leaf spring is engaged with the arcuate surface associated with the selected catch surface, and this engagement between the leaf spring and the selected catch surface rotating the disk to a limited extent with respect to the reel when the reel is rotated to a limited extent in the belt winding direction such that this relative rotation changes the surfaces on the reel which the leaf spring is engageable with or is blocked from engagement with in a manner that allows selective control of the rotational positions at which the leaf spring holds the belt reel against the winding bias of the spring means so as to thereby allow adjustment of the length of the belt that is held unwound for use.

* * * * *